United States Patent [19]

Nishitani

[11] 4,147,911

[45] Apr. 3, 1979

[54] METHOD FOR SINTERING REFRACTORIES AND AN APPARATUS THEREFOR

[75] Inventor: Teruyuki Nishitani, Himeji, Japan

[73] Assignee: Nippon Steel Corporation, Tokyo, Japan

[21] Appl. No.: 713,148

[22] Filed: Aug. 10, 1976

[30] Foreign Application Priority Data

Aug. 11, 1975 [JP] Japan .................................. 50/97268

[51] Int. Cl.² .............................................. H05B 9/03
[52] U.S. Cl. ........................... 219/10.55 M; 106/39.5; 219/10.55 R; 264/25; 106/39.5
[58] Field of Search ................ 219/10.55 A, 10.55 M, 219/10.55 F, 10.55 E, 149; 264/56, 30, 25

[56] References Cited

U.S. PATENT DOCUMENTS 1,868,091  7/1932  Brooke ................................. 219/393
4,057,702  11/1977  Lacombe-Allard .......... 219/10.55 A Primary Examiner—J. V. Truhe
Assistant Examiner—Bernard Roskoski
Attorney, Agent, or Firm—Toren, McGeady and Stanger

[57] ABSTRACT

A method for sintering refractories comprising adding 0.05 to 10% by weight of an electro-conductive particles to a group of dielectric refractory particles to obtain a mixture thereof, and heating the mixture by means of microwave induction heating to sinter the refraction.

3 Claims, 5 Drawing Figures

Heating curves of electro-conductive particles

Frequency: 2450 MHz
Input Power: 1.0 Kw
Weight: 200-300g

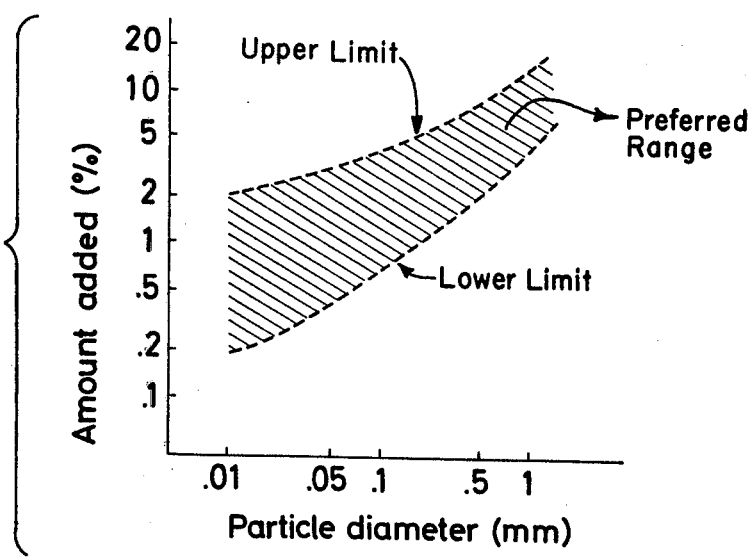
FIG. 1
FIG. 2
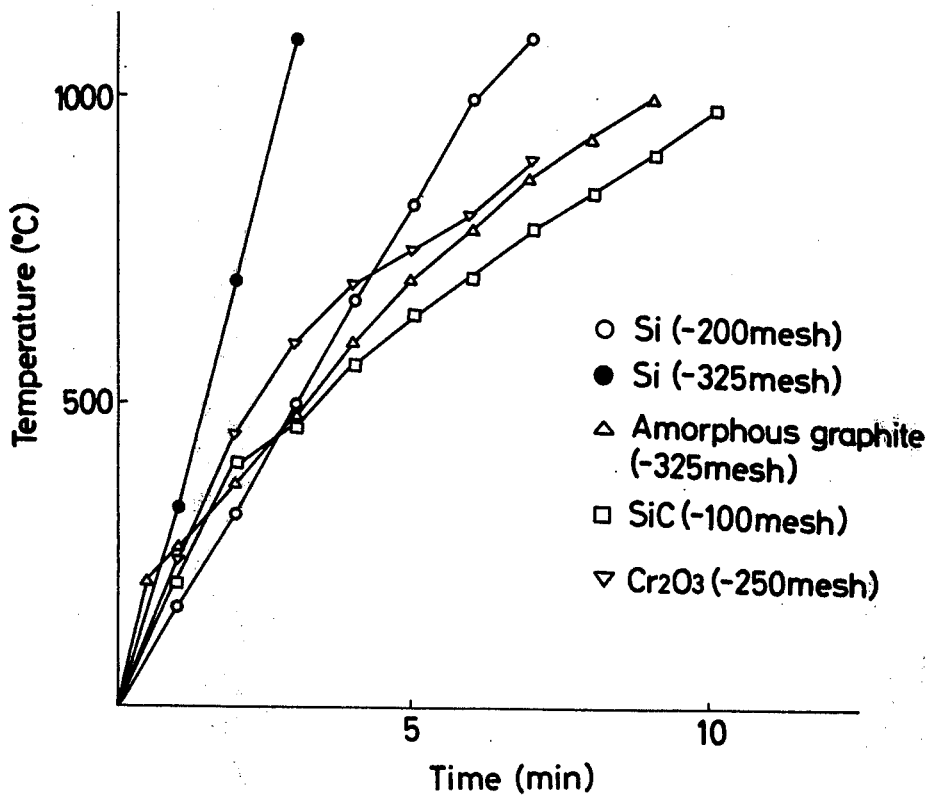
Heating curves of electro-conductive particles
Frequency: 2450 MHz
Input Power: 1.0 Kw
Weight: 200~300g Effect of the addition of an electric conductor to the heating characteristic of dielectric refractory particles (Pyrophyllite 40%+Zircon 60%)

{ Frequency: 2450 MHz
  Input Power: 1.0 Kw
  Weight: 100~200g

METHOD FOR SINTERING REFRACTORIES AND AN APPARATUS THEREFOR

FIELD OF THE INVENTION

The present invention relates to a method for effectively formed refractory bodies comprising a group of dielectric refractory particles by utilizing microwave induction heating.

In the present invention, dielectric refractory particles means that the particles are a dielectric substance, i.e., an electric insulator, at normal temperature and having refractoriness. Practically, oxides, such as, magnesia, alumina, silica, dolomite and mullite, nitrides, such as, silicon nitride and boron nitride, borides and their mixtures are included.

These substances have been used industrially as a ceramic material in the fields of electrical machinery and refractory ceramics, and their characteristic is that their electric conductance is small and they are electric insulators.

DESCRIPTION OF PRIOR ART

Some types of these refractory particles are used to produce refractory bricks and sintered ceramics formed by press forming, slip casting and other methods and then sintering in various ceramic furnaces, such as, a round kiln, a rectangular kiln and a tunnel kiln. Other types are lined inside of a steel shell of various furnaces in the form of refractory mixes, such as, ramming refractories and castable refractories, dried and sintered in situ in the course of operating the furnace.

Usually refractory materials are sintered at a temperature higher than 1000° C. For instance, the sintering of higgh alumina bricks and basic bricks, which are used widely in the iron and steel making industry, and other industries is done by firing at a temperature as high as 1500° to 1700° C. for several ten of hours under an appropriate temperature control. There is no essential difference in manufacturing refractory mixes for use in the iron and steel industry and others, in which the refractory materials are subjected to ramming, casting and other treatments, heated up to about 1000° C. after sufficient drying, and then sintered in the course of operation.

As a means to heat to such a high temperature in sintering refractory bricks and the like, kilns such as tunnel kiln having numerous heavy oil burners, are used. In the case of refractory mixes, the heating up is done with the use of gas burners and the like and the sintering is performed directly with the use of the operation heat of the furnace. However, in the former case, various problems occur because the sintering temperature is very high. Not only is a large heat consumption necessary, but also, there is a problem of atmospheric pollution due to the evolution of sulfur dioxide and other gases so that a prompt counter measure has been desired. These requirements become more serious as a product of more excellent quality is wanted.

In the latter case, it is usual that the corrosion resistance is inferior as compared with the sintered body obtained with the former process due to the incompleteness of thee sintering. It thus becomes necessary to use better materials in order to obtain s sufficient corrosion resistance. Further, since said both methods use burners which are external and provide indirect heating, the heating requires a long while and the temperature distribution is not uniform.

As above stated, both sintering refractory bricks and sintered ceramics at higher temperatures and sintering refractory mixes in situ requires a new method in which the thermal efficiency is good, the temperature control is easy and atmospheric pollution is avoided. As a heating means to satisfy these requirements, the electric heating methods are promising, and above all, microwave induction heating has the merit of utilizing electromagnetic waves transmitted through the air. Thereby, the restrictions encountered in the other electric heating methods, such as, the necessity to use electrodes, induction coils and so on for the heating chamber, and the method is particularly beneficial in heating up to a very high temperature.

The heating method with the use of microwaves is well known as dielectric heating, to utilize the phenomenon that substance having a large dipole moment (such as water) generates heat in itself by dielectric absorption. It is well known thereby that a uniform and prompt heating is possible as compared with conventional heating methods. Among the substances having a large dipole moment, the one having a particularly large dielectric absorption and suitable as an additive to various materials to be heated is water, and water has been utilized in most of the microwave heating processes.

Physical values to represent the degree of dielectric absorption of a substance are the specific dielectric constant $\epsilon'$ and the dielectric loss angle $\tan \delta$, and the greater the product of these two factors is, the larger the dielectric absorption and the heat generation are. For instance, at a frequency of 2450 MHz and at 25° C., the two values for water of $\epsilon' = 77$ and $\tan \delta = 1600 \times 10^{-4}$ are far larger than the values for glass of $\epsilon' = 5$ and $\tan \delta = 100 \times 10^{-4}$. However, water shows such large values only in the liquid state and decreases the values in the solid and gaseous states. For instance the values of ice are $\epsilon' = 3$ and $\tan \delta = 9 \times 10^{-4}$, so that sufficient heating can not be expected at higher temperatures. An advantage of vapor is that the microwave absorption is small but the drying becomes disadvantageous in heating above 100° C. For microwave heating above 100° C., the base material itself can be utilized in some instances, for example, as in the welding in vinyl chloride resin, but the dielectric absorption is small in this case and it is necessary to elevate the electric field strength. Moreover, many organic substances having a large dipole moment decompose at relatively lower temperatures, so that it is impossible to utilize them for the heating up to a high temperature to sinter refractories. Although the dielectric absorption of the refractory materials is small, they can, of course, be utilized for the heat generation in the microwave heating by elevating the electric filed strength, but this is difficult to accomplish in practice, particularly because the apparatus becomes complicated.

SUMMARY OF THE INVENTION

The present invention offers an epoch-making new method for sintering refractories which differs essentially from the conventional methods, and is characterised in that 0.05 to 10% by weight of electro-conductive particles are added to a group of dielectric refractory particles to produce a mixture thereof, and the mixture is heated by means of microwave induction heating for sintering.

In the present invention, the heating of a dielectric substance up to a high temperature by microwave heating, which has never been considered possible, is accomplished by the addition of an electric conductor thereto, and this technic is applied for an epoch-making method of sintering refractory materials to obtain refractories having excellent characteristics.

While the principle of heating in the present invention differs somewhat in accordance with the kinds of electric conductor to be added, the heating is essentially done by the heat generated due to the Joule effect. It is well known that an electric conductor, such as, a metal is a good reflector for the electromagnetic waves in the microwave region, and the permeation of microwaves into the interior thereof is limited only to a depth in the order of several microns to several ten microns from the surface due to the skin effect because the frequency of microwaves is very high. However, after various experiments, the present inventors obtained the following result. Namely, as above mentioned, in an electric conductor, such as, a metal, coarse particles reflect a greater part of microwaves absorbing only a part thereof due to the skin effect, so that only a very thin surface layer is heated leaving the interior completely unheated. Thus, the heat generated per unit volume is very small. However, when the particle size of the electric conductor is reduced to the order of the skin depth by the micropulverization, the specific surface increases, increasing the portion effectively heated, so that the particles are completely heated and the amount of heat generated per unit volume is increased.

Therefore, from the economical point of view, it is desirable to maintain the particle size not smaller than the order of the skin depth.

From the practical point of view, the temperature can effectively be raised when the particle diameter of the electric conductor to be added is within 5 to 10 times of its skin depth. Fibrous substances and the like can also be used effectively as an electric conductor. As said electric conductor, for instance, metal particles having a specific electric conductivity of not less than $10^{-3}\Omega^{-1}{}_{cm}{}^{-1}$ at 1000° C., such as, particles of Al, Mg, Cr, Si and Fe—Si may be used, and non-metal particles, such as, carbon, SiC, $\beta$-Al$_2$O$_3$ and Cr$_2$O$_3$ can also be added.

By the distribution of fine powders of said electric conductor uniformly in the refractory particles, the temperature of a formed refractory body can be raised almost uniformly by microwave heating. When the amount of an electric conductor is too small, its heating effect is insufficient even though the mixing is uniform, and the refractory particles can not be heated uniformly up to a temperature for sintering. In the present invention, the amount of an electric conductor to be added is defined to not less than 0.05 wt.% or desirously not less than 0.1 wt.%.

On the other hand, when a substance having excellent electric conductivity, such as, a metal is used as said electric conductor, and particularly when it is present in a large amount, its particles adhere to each other due to melting and thermal shrinkage as the temperature is raised, so as to form a larger particles or a net work thereof, so that a reflection effect of the microwave appears and the heating effect is reduced. This phenomenon is remarkable in the vicinity of the melting point of the added substance.

Further, the substance to be added acts in some instances as an impurity to the refractory particles, and a substance, such as, a metal having different characteristics from the refractory particles causes the formation of fine cracks and other defects in the product. Therefore, it is important to carefully investigate the amount, particle size and quality of the substance to be added. In the present invention, the upper limit of the amount of an electric conductor is restricted to not more than 10 wt.% or desirously not more than 5 wt.%.

In addition to excellent electric conductors, such as, metals, those having less remarkable but at least a small electric conductivity and at the same time having refractoriness, such as, carbon and silicon carbide, can be used as an electric conductor, particularly most effectively in the case of producing refractory mixes, to improve the characteristics of the product. It is desirous in general to add an excellent electric conductor, such as, a metal and an electric conductor, such as, carbon in combination to reduce the amount of the excellent electric conductor to be added. Highly refractory substances, such as $\beta$-Al$_2$O$_3$ and Cr$_2$O$_3$ may also be added to improve the characteristics of the product.

DETAILED DESCRIPTION OF THE INVENTION

The present invention will be understood more clearly from the following descriptions referring to the attached drawings.

BRIEF EXPLANATION OF DRAWINGS

FIG. 1 is a graph showing the relation between the particle size of Mg and its amount when magnesium is added as an electric conductor in the sintering of magnesia clinkers by microwave heating.

FIG. 2 shows the heating characteristics of Si, amorphous graphite and SiC themselves as electro conductive particles in microwave heating.

DESCRIPTION OF THE PREFERRED EMBODIMENTS

As understood from FIG. 1 when the particle size of Mg is reduced, its surface area increases and Mg is distributed uniformly in magnesia clinkers, so that its addition amount can be reduced.

As above mentioned, various kinds of electric conductors can be used. However, those having a harmful influence on the characteristics of the refractories sintered are not desirous as an additive, and the economic side must also be considered. It is desirous usually to select a substance having excellent refractoriness in itself or as an oxide and which does not deteriorate the characteristics due to a reaction with the refractory base material. As practical examples, aluminum, silicon, ferrosilicon, silicon carbide, carbon, titanium, chromium, $\beta$-Al$_2$O$_3$ and Cr$_2$O$_3$ are suitable as an additive for alumina-silica type refractories, and magnesium, calcium, aluminum, chromium, carbon, silicon carbide, $\beta$-Al$_2$O$_3$ and Cr$_2$O$_3$ are suitable as an additive for basic refractories such as magnesia and calcia. As a binder, water glass, phosphates and others are used.

Figure 3:
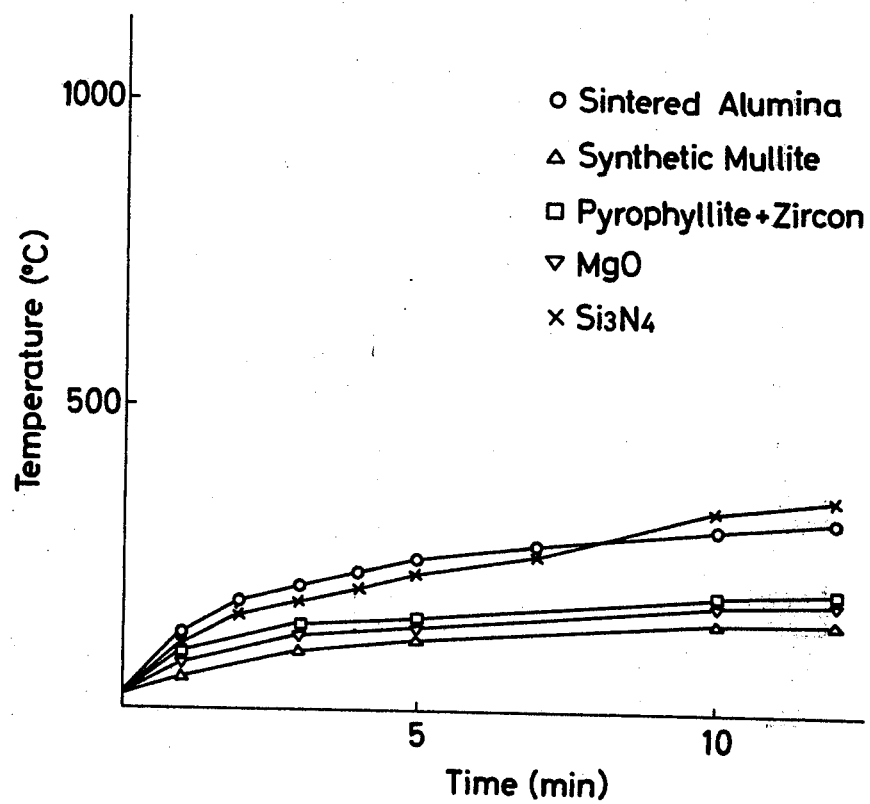
FIG. 3 shows the heating characteristics of sintered alumina, synthetic mullite, a mixture of pyrophyllite and zircon, MgO and Si$_3$N$_4$ themselves as dielectric refractory particles in microwave heating.
Figure 4:
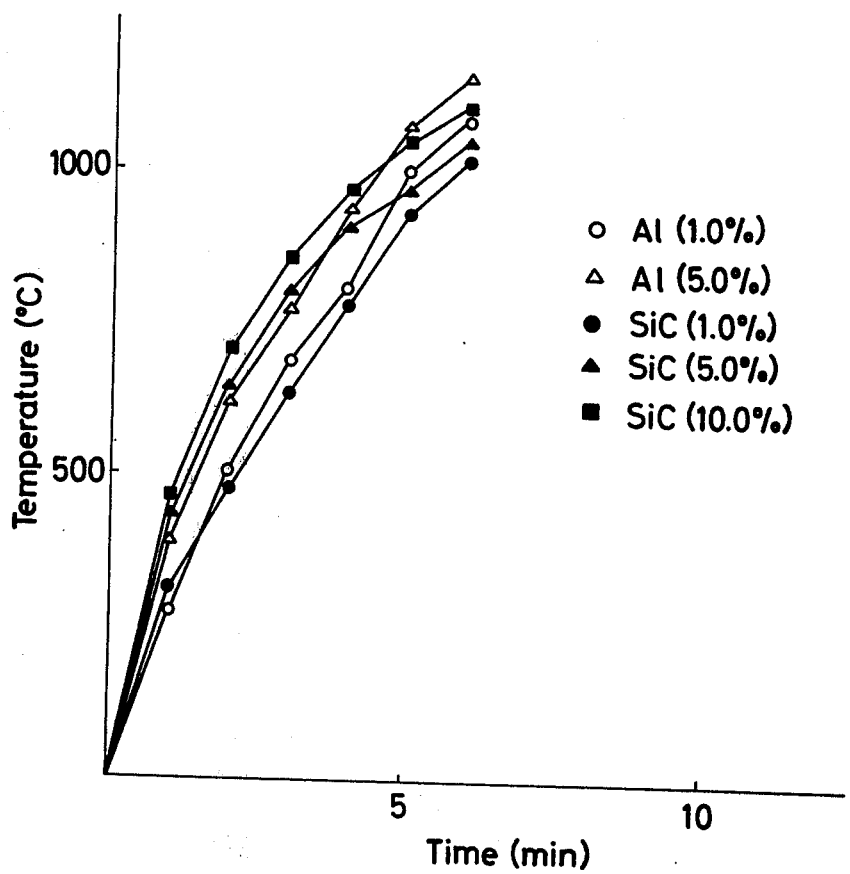
FIG. 4 shows the heating characteristics of the mixtures of dielectric refractory particles comprising 40% of pyrophyllite and 60% of zircon to which varying amounts of Al and SiC are added in microwave heating.
Figure 5:
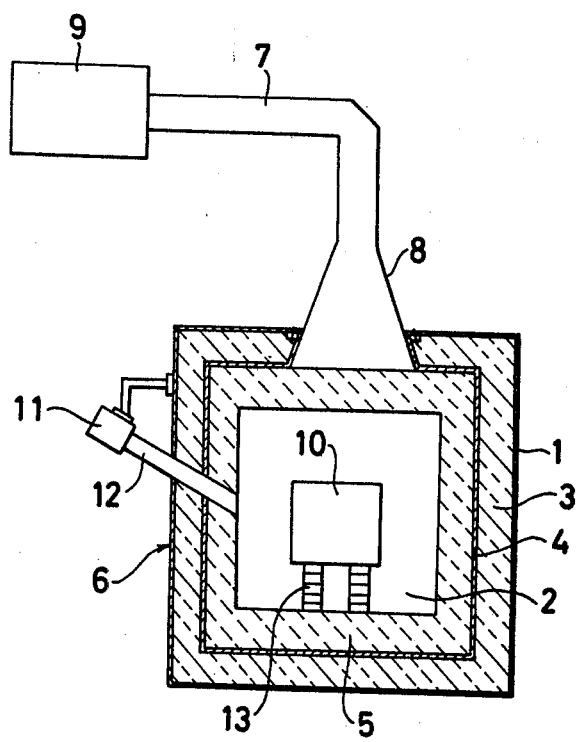
FIG. 5 is a sectional drawing of a firing furnace for carrying out the present invention.

A definite amount of electro conductive particles selected from the substances as above mentioned is added to a group of dielectric refractory particles, mixed nearly uniformly and formed into bricks and other desired shapes, and formed refractory bodies thus obtained are fired in an apparatus as shown in FIG. 5 for sintering.

FIG. 5 is an explanatory drawing to show the section of a firing furnace (6) to perform the present invention. As seen from the drawing to construct a firing furnace (6), a backup insulator wall (3) is equipped inside of a metal wall (1) forming a space (2). A metal plate (4) is applied inside of said backup insulator wall (3) and a hot face insulator wall (5) comprising low dielectric loss refractories, such as, ceramic fibers and pure high alumina bricks is equipped inside of said metal plate (4). Formed refractory bodies to be sintered (10) are placed in the position as shown in the figure A wave guide (7), an antenna (8) and a microwave generator (9) are attached to said firing furnace (6), and the furnace serves as a cavity resonator. In said firing furnace (6), a metal plate (4), or a metal plate (4) and a hot face insulator wall (5) may be substituted with a graphite wall (not shown in the figure). (11) is a radiation pyrometer, (12) is an eye-hole comprising a metal pipe and (13) are refractory bricks to support formed refractory bodies (10).

In the sintering of said formed refractory bodies, the heating velocity can be controlled by the output of the microwave supplied. Although differing from the atmospheric condition of the firing furnace, there is a danger that the oxidation of metal powders proceeds slowly at the central portion of a formed body leaving free metal in some instances after firing in the firing of formed bodies containing metal powders as an electric conductor. When magnesium is added not only does it remain partially as free metal, but also it changes partially to a nitride with the composition of $Mg_3N_2$, and said nitride is decomposed by the absorption of water deteriorating the characteristics of the product. There is another problem i.e., forming the cracks of and others defects in the product due to the difference in the properties between the free metal remaining and the metal oxide the as refractories.

In the present invention, these difficulties are solved by the addition of an oxidant. Thereby, metal powders are oxidized to form oxide in the course of the firing thereby eliminating said difficulties.

As an oxidant, chlorates, perchlorates and nitrates of alkali and alkaline metals, such as, $KClO_3$, $NaClO_3$, $KClO_4$, $Ca(ClO_3)_2$ and $Mg(NO_3)_2$ and further $NH_4ClO_4$, $NH_4NO_3$ and the like can be applied. The amount of said oxidant is controlled in accordance with the amount of metal powders, the atmospheric condition in the firing and so on. When the amount of the oxidant is too much, the oxidation of the metal proceeds too fast, diminishing the function of the metal as an electric conductor, so that the amount of the oxidant to be added is restricted within the chemical equivalent to the metal powders added.

The present invention will be explained on the basis of the following practical examples.

EXAMPLE 1.

Sintering of refractory mixes for the ladle in steel making (1) Composition of the refractory material for the charge Pyrophyllite: 40 parts
Zircon: 60 parts
Water glass: 5 parts (binder)
Water: 5.5 parts (2) Forming and Heating The charge was formed by vibration forming, and heated up to 1200° C. with a heating velocity of 400° C./hr by applying microwaves of 915 MHz.

The result was as shown in Table 1.

Table 1

| Sample | Additive Substance | Amount % | Particle size mesh | Apparent porosity % | Compressive strength kg/cm² | Formability | Heating |
|---|---|---|---|---|---|---|---|
| A | no | — | — | 20.0 | 250 | good | — |
| B | SiC | 0.5 | 100 | 20.0 | 290 | good | fairly smooth |
| C | SiC | 1.0 | 100 | 20.5 | 290 | good | smooth |
| D | SiC | 5.0 | 100 | 24.4 | 200 | somewhat bad | smooth |
| E | SiC | 10.0 | 100 | 26.5 | 140 | bad | smooth |
| F | Al | 0.5 | 270 | 20.2 | 290 | good | smooth |
| G | Al | 1.0 | 270 | 21.0 | 260 | good | smooth |
| H | Al | 5.0 | 270 | 25.5 | 170 | bad | smooth |
| I | Al | 15.0 | 270 | 27.0 | 110 | bad | difficult* |

A Usual burner heating
B–I Microwave heating
*The temperature could not be raised above 700° C.

(3) Discussion of the result

Samples B – H to which SiC or Al was added could be heated smoothly up to 1200° C. Although sample I to which 15% of Al was added could be heated smoothly and the voltage standing wave ratio (which expresses the matching relation to the load) was also good up to 500° C., the temperature rose slowly from 500° C. and particularly from 600° C., and the heating was difficult above 700° C. The tendency was more distinct in the addition of a still larger amount of Al (although not shown in Table 1), so that the phenomenon was perhaps due to the adhesion of metal particles to each other by melting as already mentioned. It is seen in Table 1 that the more the amount of the additive is, the more the characteristics of the product becomes worse, but this is perhaps due to the influence of keeping the particle size distribution of the refractory base material constant. It is expected that an excellent result can be obtained by controlling the particle size thereof appropriately.

EXAMPLE 2

Sintering of magnesia refractory bricks (1) Composition of the refractory particles MgO: 95 parts
CaO: 1.3 parts
$SiO_2$: 2.7 parts
$Fe_2O_3$: 0.1 parts
$Al_2O_3$: 0.2 parts Said refractory particles comprised coarse particles (3 – 1 mm), medium particles (1 – 0.1 mm), fine particles (< 0.1 mm) and very fine calcined magnesia.

(2) Forming and heating

Said refractory particles were mixed with the addition of the additives for heating shown in Table 2, a small amount of bittern ($MgCl_2$) as a promoter for sintering and a binder, press formed with a load of 1000 kg/cm², dried, heated with a heating velocity of 300° to 500° C./hr by applying microwaves of 2450 MHz, and held for 2 hours at a temperature 1650° to 1750° C. for sintering.

The result was as shown in Table 2.

Table 2

| Sample | Additive Substance | Amount % | Particle size mesh | Sintering temperature °C. | Bulk density g/cm³ | Hot bending strength/1200° C. kg/cm² |
|---|---|---|---|---|---|---|
| A | no | — | — | 1650 | 2.98 | 70 |
| B | Mg | 1.0 | 200 | 1650 | 2.96 | 70 |
| C | Mg | 1.0 | 200 | 1650 | 2.99 | 75 |
|   | KClO₃ | 0.7 | — |   |   |   |
| D | Mg | 5.0 | 200 | 1650 | 2.85 | 60 |
|   | KClO₃ | 5.0 | — |   |   |   |
| E | Mg | 1.0 | 200 | 1750 | 3.05 | 85 |
|   | KClO₃ | 0.7 | — |   |   |   |

A .... In a usual electric furnace (kept for 6 hrs.)
B-E. Microwave heating Very fine powders of Mg and KClO₃ (oxidant) were dispersed uniformly in the bricks.

(3) Discussion of the result

KClO₃ was added in samples C – E in an amount 40 to completely 60% of Mg in chemical equivalent to oxidise Mg. When the amount of Mg was large, Mg was not oxidised completely thus deteriorating the characteristics of the product. Not only free Mg remained, but also, Mg changed to a nitride with the composition of Mg₃N₄, and said nitride decomposed gradually by the absorption of water. Although differing from the atmospheric condition in sintering, it is desirous to add a small amount of fine powders of the metal and particularly to distribute the metal primarily in the central portion of the refractory body where the oxidation takes place slowly. Sample E was sintered at a higher temperature, so that a part of the matrix was partially molten to form a strong bond. However, since MgO has a tendency to volatilize at higher temperatures, it is not desirous to sinter MgO at ordinary pressures.

EXAMPLE 3

Sintering of alumina refractory bricks (1) Composition of the refractory particles (corundum)

Al₂O₃: 99.52%
SiO₂: 0.04%
Fe₂O₃: 0.02%
Na₂O: 0.32%
C: 0.10%

Said corundum comprised coarse particles (3 – 1 mm), medium particles (1 – 0.1 mm) and fine particles (<0.1 mm).

(2) Forming and heating

Said corundum particles are mixed with the addition of the additives for heating as shown in Table 3 and a small amount of a binder, press formed with a load of 1000 kg/cm², dried, heated with a heating velocity of 300° to 600° C. by applying microwaves of 2450 MHz and held for 2 hours at 1780° C. for sintering.

The result was as shown in Table 3.

Table 3

| Sample | Additive Substance | Amount % | Particle size mesh | Bulk density g/cm³ | Hot bending strength/ 1200° C. kg/cm² |
|---|---|---|---|---|---|
| A | no | — | — | 3.05 | 65 |
| A' | no | — | — | 3.05 | 65 |
| B | Al | 0.5 | 200 | 3.00 | 60 |
| C | Al | 0.5 | 200 | 3.05 | 65 |
|   | Al | 0.5 | 200 |   |   |
| D |   |   |   | 3.05 | 70 |
|   | KClO₃ | 0.2 | — |   |   |

A .... Ordinary sintering (kept for 4 hours)
A'-D .. Microwave heating
B .... Fine Al powders were distributed uniformly in the bricks.
C .... The distribution of fine Al powders was rich in the central and surfacial portion of the bricks.
D .... The amount of KClO₃ corresonds to 10% of Al in chemical equivalent.

(3) Discussion of the result

Example 3 belongs to a special case, in which the refractory base material itself contains an electric conductor. The reason why sample A', in which corundum was fired with no special addition of an electric conductor, could be heated smoothly may be due to the fact that a small amount to β-Al₂O₃ and carbon remaining in the corundum in the electro-melting treatment acts as an electric conductor to raise the temperature smoothly. In samples B – D, Al is added intentionally to make the voltage standing wave ratio favorable and to raise the temperature smoothly. Particularly, in samples C and D, the distribution of the electric conductor and the oxidant in the bricks was controlled to prevent the irregularity in the firing.

As shown by the above explanations on the results of the three examples in the above. The additives having a bad influence and deteriorating the characteristics of the product when they are left in the product, such as, certain kinds of metal, could be oxidised completely by adding an oxidant. Further, in the present invention, such procedures are possible in accordance with the size and shape of the product so that a uniform sintering is effected by controlling the mixing by considering the distribution of the additives and that, on the contrary, the surface portion is sintered intensely.

As above described, the present invention provide, by utilizing microwave induction heating under the addition of an electric conductor, an epoch-making new method for sintering refractories having the advantages, when compared with the conventional method of firing in a kiln of excellent efficiency, easy temperature control and the elimination of atmospheric pollution. It is sufficient in the present inventive method only to add some additives to the refractory base materials. The apparatus to perform said method is very simple, and there is almost no need for restrictions in the apparatus. It is sufficient merely to provide a cavity resonator surrounded with a metal wall and there is entirely no need of equipment, such as an resistance heating element and an induction coil as in the other electric heating methods. The present inventive method can be widely applied in various fields, and particularly it is of great merit in that such articles that have hitherto been obliged to be used as refractory mixes can be sintered as they are.

What is claimed is:

1. A method for sintering refractories which comprises mixing a group of dielectric refractory particles with 0.1 to 5% by weight of an electric conductor, in which the particle size of the electric conductor is not more than 10 times the skin depth of the conductor in the microwave region, forming the mixture and sintering the formed mixture thus obtained by means of microwave induction heating in a space surrounded by a metal wall.

2. A method for sintering refractories according to claim 1 in which said electric conductor comprises particles selected from the group consisting of metal and non-metal particles having a specific electric conductivity of not less than $10^{-3}$ $\Omega^{-1}\text{cm}^{-1}$ at higher temperatures.

3. A method for sintering refractories according to claim 1 in which a solid oxidant is added when said electric conductor comprises metal particles.

* * * * *